(No Model.) 2 Sheets—Sheet 2.

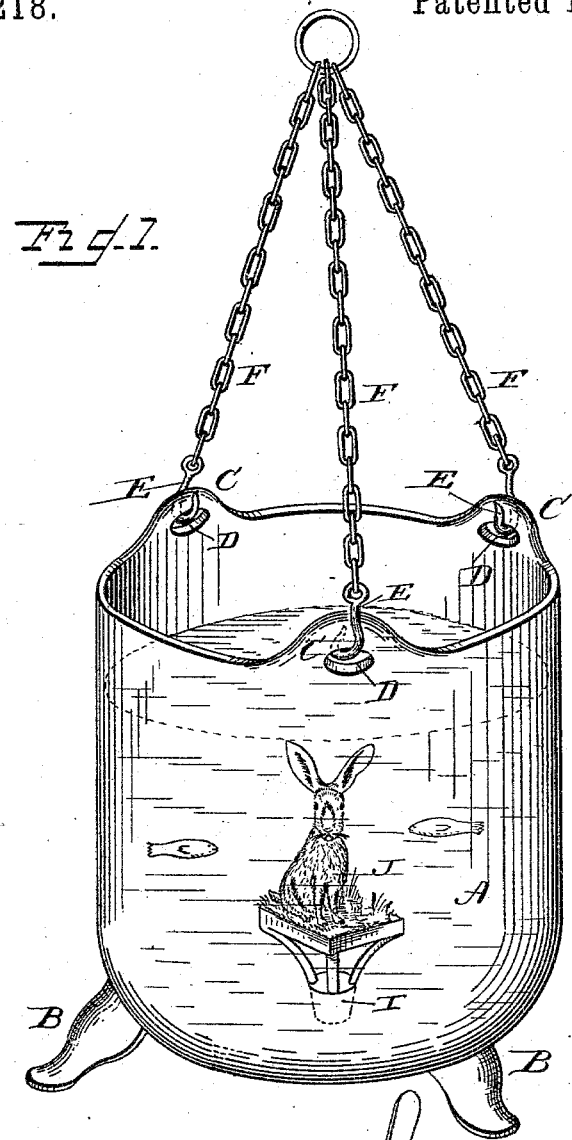

F. C. ZANETTI.
AQUARIUM.

No. 295,218. Patented Mar. 18, 1884.

WITNESSES
Franck L. Ourand
J. Reed Littell

INVENTOR
F. C. Zanetti
by
C. A. Snow & Co.
Attorneys

UNITED STATES PATENT OFFICE.

FORTONATO CLEMENTE ZANETTI, OF BRYAN, TEXAS.

AQUARIUM.

SPECIFICATION forming part of Letters Patent No. 295,218, dated March 18, 1884.

Application filed February 10, 1883. (No model.)

*To all whom it may concern:*

Be it known that I, FORTONATO C. ZANETTI, a citizen of the United States, residing at Bryan, in the county of Brazos and State of Texas, have invented a new and useful Aquarium, of which the following is a specification, reference being had to the accompanying drawings.

This invention relates more especially to the manufacture of aquaria for keeping gold and other ornamental fishes; and it consists in certain improvements in the construction of the same, having for their object to produce an ornamental and attractive suspension aquaria from which the water may be easily removed for the purpose of renewing it, as will be hereinafter fully described, and particularly pointed out in the claim.

Figure 2:
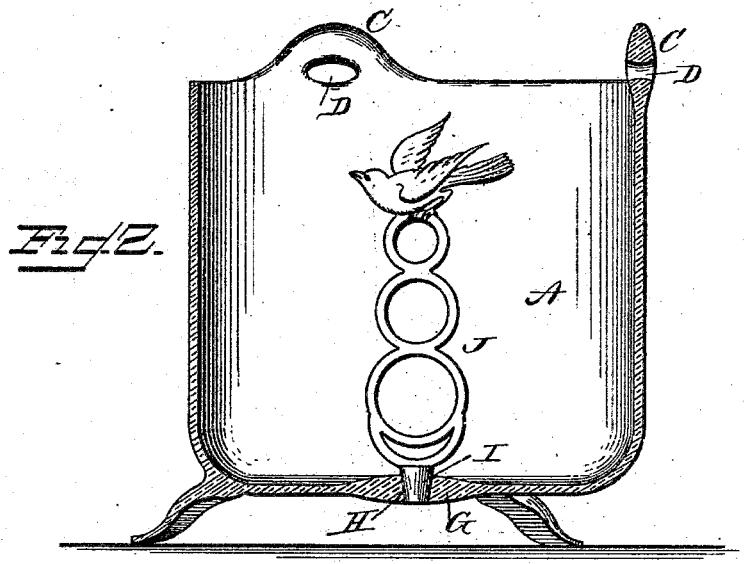

In the drawings hereto annexed, Figure 1 is a perspective view of my improved aquarium. Fig. 2 is a vertical sectional view of the same, and Fig. 3 is a perspective view of the plug or stopper detached, and Fig. 4 is a perspective view showing a modification.

The same letters refer to the same parts in all the figures.

A in the drawings designates a suitable jar or vase, made of white glass in any suitable ornamental shape, and supported upon three or more feet of any desired configuration, formed integrally therewith. The upper edge of the jar or vase A is provided with three thickened or re-enforced enlargements, C C, which are perforated, as at D, to receive hooks E at the ends of chains F, by which the device may be suspended either indoors or out, when this shall be desired. The center of the bottom between the legs which are designated by letters B B, is thickened or re-enforced, as shown at G, and provided with a conical perforation or aperture, H, through which the water may be drained off whenever it shall be desired to renew it. For the perforation H a plug or stopper, I, is provided, which should be ground so as to fit nicely in the said perforation. This plug, which I prefer to make of colored glass, porcelain, majolica, or other ornamental material contrasting with the white glass of which the vase or jar is made, has an enlarged head, J, which is to be molded or formed so as to form an interior ornament or decoration for the aquarium, and which may represent a man or woman, animal, plant, rock, house, or castle, or, in fact, any desired ornamental object which is supported by the plug I inside the vase or jar.

Figure 4:
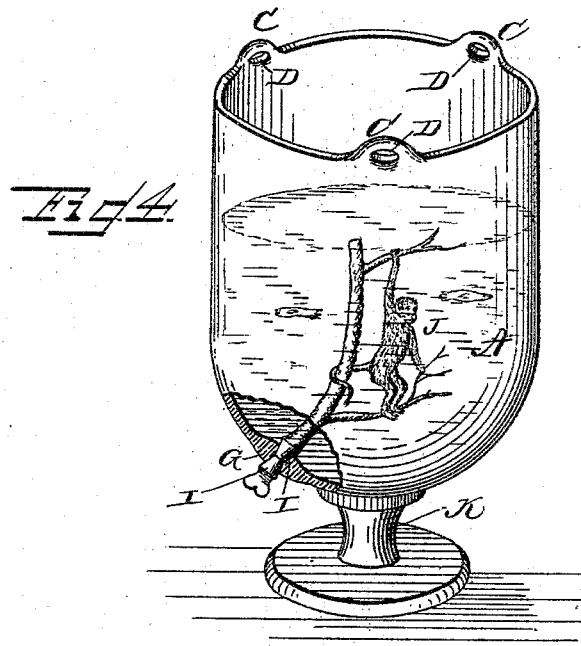

In the modification shown in Fig. 4 of the drawings the vase or jar is supported upon a single foot, K, and this makes it necessary to locate the perforation for the stopper near the side instead of centrally in the bottom. In other respects the construction is the same as above described.

My improved aquarium when properly constructed will form an exceedingly attractive ornament for private as well as public places. The contrasting colors and ornamental designs of the jar or vase and the interiorly-located decorated plug or stopper will prove pleasant and refreshing to the eye, and will display to advantage the natural beauty of the ornamental fishes and other aquatic animals with which the aquarium may be stocked. The water may with but little trouble be frequently renewed, thereby insuring the healthy condition of the fishes, and the device, being provided with feet, will readily stand upon any article of furniture, or it may be suspended either indoors or out.

If desired, the perforation on the bottom of the vase may be double conical in shape, and ornamental plugs may then be inserted from both the top and bottom.

I claim as my invention and desire to secure by Letters Patent of the United States—

The herein-described improved aquarium, consisting of the vase or jar with a base support, and provided at its upper edge with the thickened perforated enlargements for the suspending-chains, and having a re-enforced bottom provided with an aperture, and a plug inserted from within the jar and provided with an interior enlarged ornamental head, as set forth.

In testimony that I claim the foregoing as my own I have hereto affixed my signature in presence of two witnesses.

FORTONATO CLEMENTE ZANETTI.

Witnesses:
B. F. McKEY,
J. W. TABOR.